United States Patent [19]

Peng et al.

[11] 4,062,555
[45] Dec. 13, 1977

[54] STRUCTURE FOR FOLDABLE BABY CARRIAGE

[76] Inventors: Luke Shih-Cheng Peng, No. 30-1, Lane 350, Wu Hsing St.; Herbert Chia-Chen Yu, No. 2-4, Alley 12, Lane 118, Jen Ai Road, Sec. 3, both of Taipei, China /Taiwan

[21] Appl. No.: 738,126

[22] Filed: Nov. 2, 1976

[51] Int. Cl.² ............................................. B62B 11/00
[52] U.S. Cl. ...................................... 280/42; 280/647; 280/650; 297/45
[58] Field of Search ................... 280/42, 647, 648, 650; 297/45

[56] References Cited

U.S. PATENT DOCUMENTS

| | | | |
|---|---|---|---|
| 3,836,164 | 9/1974 | Sugino | 280/42 |
| 3,945,662 | 3/1976 | Zalewski | 280/42 |
| 3,968,991 | 7/1976 | Maclaren | 297/45 |
| 3,995,882 | 12/1976 | Watkins | 280/42 |

Primary Examiner—Robert R. Song

Attorney, Agent, or Firm—Burns, Doane, Swecker & Mathis

[57] ABSTRACT

Structure for foldable baby carriage comprises: a pair of four bar linkages each having a seat tube, a back tube with its lower end connected to the rear end of the said seat tube and its upper end extending upward, an arm rest member with its rear end pivoted to the middle portion of the said seat tube and its front end extending forward, and a front leg extending downward with its upper end pivoted to the front end of the said arm rest and its middle portion pivoted to the middle of the said seat tube; two cross frames, the one with its upper ends pivoted to the front ends of the seat tubes and its lower ends pivoted to the lower ends of front legs, and the other with its lower ends pivoted to the rear ends of the seat tubes and its upper ends to the middle portions of the back tubes; two rear legs extending downward each with its upper end pivoted to the middle portion of the arm rest and its middle portion passing through a sliding sleeve pivoted to the rear end of the said seat tube; and two pairs of twin type wheel sets respectively provided under front and rear legs.

6 Claims, 5 Drawing Figures

STRUCTURE FOR FOLDABLE BABY CARRIAGE

FIELD OF THE INVENTION

The present invention relates generally to a novel structure for foldable baby carriage and more particularly to a structure for baby carriage, chair or the like, the folding or unfolding of which is capable of being accomplished by one operation upon any one of the structure members. The whole structure when in a collapsed condition to occupy a relatively small or diminished cross-sectional area to facilitate carrying, storing, packing and transportation.

BACKGROUND OF THE INVENTION

The prior art comprises many folding carriage structures most of which are collapsible flat to a plain which is inconvenient for carrying. Although structures that are foldable to shape like a bundle of umbrella have been available nowadays. However the difficulty with these prior art devices is that the two side brace elements surround and confine on both sides resulting in a limited and uncomfortable seat position in which the passenger has to bend and curl in an unnatural manner without suitable arm rest place.

SUMMARY OF INVENTION

Therefore the main object of the present invention is to provide a holding structure for a carriage, chair or the like comprising two sets of four bar linkages and two sets of X frames pivoted wisely which provides both a more spacious seat and also arm rests for the passenge, resulting in a more comfortable and natural seated position. When the structure is collapsed, it retracts to form a bundle with wheels thereunder to facilitate carrying and storage.

Another object of the present invention is to provide a structure for baby carriage the folding and unfolding of which can be accomplished with just one operation.

A further object of the present invention is to provide a structure for baby carriage having seat tubes freely extendible forward, to enable putting thereon a bed or cradle for baby.

Other objects and features will become apperent from the following detailed description to be taken in conjunction with the annexed drawings.

DETAILED DESCRIPTION OF EMBODIMENT

Figure 1:
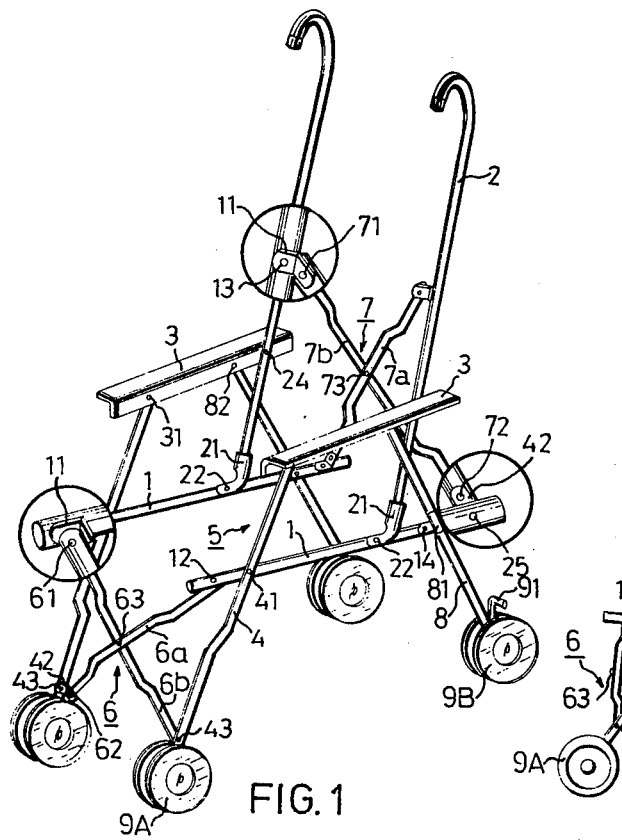
FIG. 1 is a perspective view showing an embodiment of the structure of the present invention in an unfolded condition.
Figure 2:
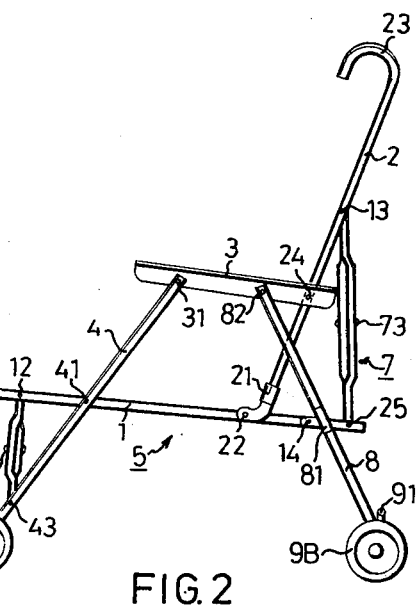
FIG. 2 is a side view of the said embodiment.

Now referring to FIGS. 1 and 2, the structure of the present invention comprises mainly two sets of four bar linkages 5 each composed of a seat tube 1, back tube 2, arm rest 3 and front leg 4. Two sets of cross frames 6, 7 respectively comprises two intersectedly pivoted tubes 6a, 6b and 7a, 7b; tow rear legs 8 and two pairs of twin wheel sets 9A and 9B.

Seat tubes 1, 1 of the two four bar linkage sets 5, 5 are extending parallel toward front, two parallely disposed back tubes 2, 2 having their lower ends pivoted to the rear ends of seat tubes 1, 1 each with a connector 21 pivoted at 22, each of tubes 2, 2 with its upper end extending upward and provided at upper-most with bent handle 23 for carrying. Near the middle portion of each back tube 2, an arm rest member 3 with its one end connected thereon with pivot 24. The other end of the arm rest 3 extends forward in a somewhat parallel manner with the seat tube 1. At front end of each arm rest 3, upper end of a front leg 4 is connected with pivot 31. Each front leg 4 with its middle portion pivotaly intersected through pivot 41 with middle portion of seat tube 1, extends downward to take at its lower end a twin wheel set 9A. The four members including seat tube 1, back tube 2, arm rest 3, and front leg 4 with pivots 22, 24, 31 and 34 constitute a four bar linkage 5.

Between front ends of two seat tubes 1, 1 and the lower ends of front leg 4, 4, ends of a cross frame 6 which is formed by tubes 6a and 6b intersectedly connected through pivot 63 are connected with L shaped connectors 11, 42 as well as pivots 12, 61 and 43, 62. Also between upper ends of back tubes 2, 2 and rear ends of seat tubes 1, 1, ends of a cross frame 7 which is formed by tubes 7a and 7b intersectedly connected through pivot 73 are connected with L shaped connectors 11, 42 as well as pivots 13, 71 and 25, 72. The abovesaid cross frames 6 and 7 are movable freely against their pivot center 63 and 73. Adjacent to the rear end of seat tube 1, between pivots 22 and 25, a sliding sleeve 81 is provided. Rear legs 8, 8 are passing through the said sleeves 81 and extending upward. The upper end of the rear leg 8 is connected to the middle portion of arm rest 3 through pivot 82. The lower end of the rear leg takes also a twin wheel set 9B. The wheel sets 9A and 9B fall on a same plane. The rear wheel sets 9B are provided with kicking brake 91 such as mentioned in a co-pending application No. 689,598, now patent No. 4,030,769, of the same inventor and shall not be detailed further.

Figures 3, 4:
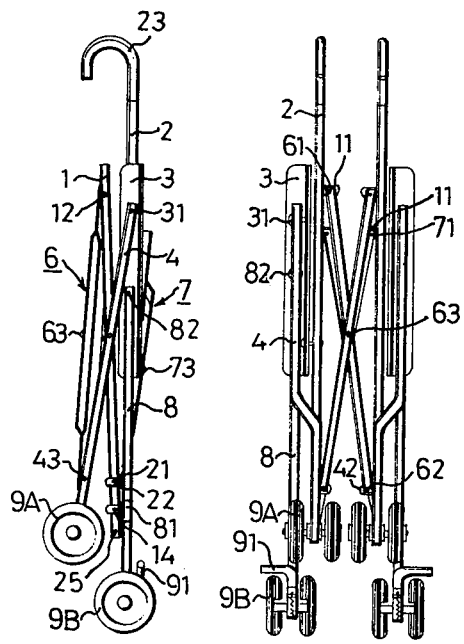
FIG. 3 is a front view showing the structure being folded up.
FIG. 4 is a side view showing the structure being folded up.

FIGS. 3 and 4 show the structure is folded up. Starting from unfolded condition as shown in FIGS. 1 and 2, one may grab either handle 23 of a back tube 2 and lift either front end of a seat tube 1, (or front end of arm rest 3), through the action of the four bar linkage, the seat tube 1 and arm rest 3 would collapse inwardly around respective pivot center 22, 24. By then, the sliding sleeves 81 slide along the rear legs 8 downward, the front and rear legs 4, 8 would revolve around pivot center 31, 82, the said legs thereby retract inwardly. In the meantime, the front and rear cross frames 6 and 7 retract around pivots 63, 73. Through L shaped connectors the cross frames cause the retraction of the two four bar linkage sets to form a bundle to facilitate carrying. Elastic clamps or strings (not shown) may be provided to fasten up the back tube 2 and the seat tube 1 so that the whole structure would not fall apart. In unfolding, just unfasten the said clamp or string, grab either of the back tube 2 and give a little shaking, the structure unfolds like shown in FIG. 1.

Figure 5:
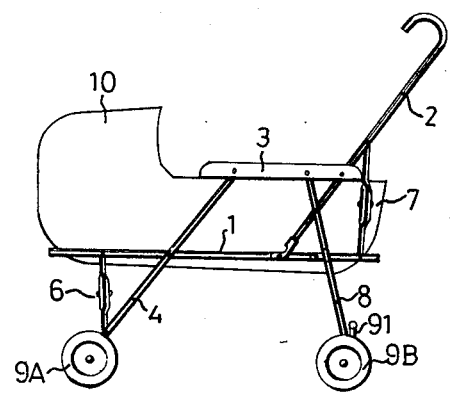
FIG. 5 is a side view showing the front end of the seat tube is made extendible to facilitate the provision of baby bed or cradle.

FIG. 5 is another embodiment depicting the present invention being used as baby bed or cradle. The structure is about the same as the above embodiment with only slight alternation in the length of members, the inclination and the position of pivots. The seat portion is made horizontal to accommodate the place of a baby bed or cradle. The corresponding members are marked with same numerals as aforesaid, therefore shall not be detailed further.

Furthermore, the above structure with wheels detached, can be applied to the structure of a chair or the like. Connecting members 11, 42 can also be U shaped other than L shaped.

The above embodiments are for the purpose of illustration and not by way of limitation. Modifications will be evident to those skilled in the art without departure from the spirit of the present invention, shall be covered under the scope of the attached claims.

We claim:

1. Structure for foldable baby carriage comprising and characterized by:
   a pair of four bar linkages each having,
   a seat tube,
   a back tube with its lower end connected to a rear portion of the said seat tube and its upper end extending upward,
   an arm rest member with its rear end pivoted to a middle portion of the said back tube and its front end extending forward, and
   a front leg extending downward with its upper end pivoted to the front end of the said arm rest and its middle portion pivoted to a front portion of the said seat tube;
   two cross frames, one of them with its upper ends pivoted to the front ends of the seat tubes and the lower ends pivoted to the lower portions of the front legs, and the other with its lower ends pivoted to the rear ends of the seat tubes and its upper ends to the back tubes above said arm rest;
   two rear legs extending downward each with its upper end pivoted to the middle portion of the arm rest and its middle portion passing through a sliding sleeve pivoted to the said seat tube between the rear end thereof and the lower end of said back tube; and
   two pairs of twin type wheel sets respectively provided under front end rear legs.

2. Structure for baby carriage according to claim 1, wherein the lower end of each of the two back tubes is pivoted to each seat tube forwardly of said sliding sleeve, and the upper end is bent to form a handle.

3. Structure for baby carriage according to claim 1, wherein the two cross frames are pivoted to related seat tube, front leg or back tube with knuckled connectors.

4. Structure for baby carriage according to claim 1, wherein the wheel sets under the rear legs are provided with brake means.

5. Structure for baby carriage according to claim 1, wherein the front and rear legs are not provided with wheels and the structure is used as a chair or the like.

6. Structure for baby carriage according to claim 1, wherein bed or cradle is provided on the seat portion.

* * * * *